No. 676,646. Patented June 18, 1901.
S. W. COLLINS.
RUBBER TIRE MACHINE.
(Application filed May 26, 1899.)
(No Model.) 2 Sheets—Sheet 1.
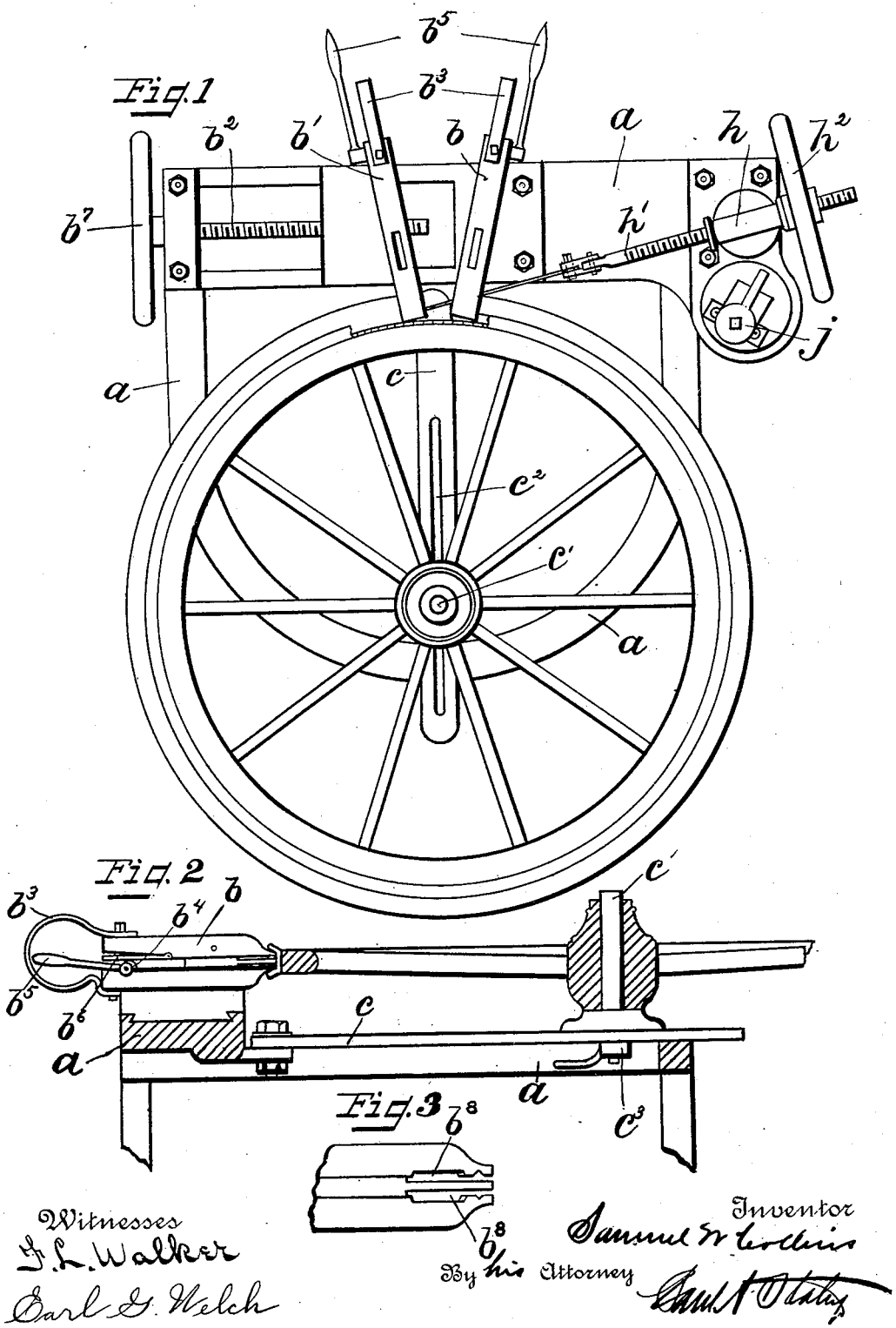

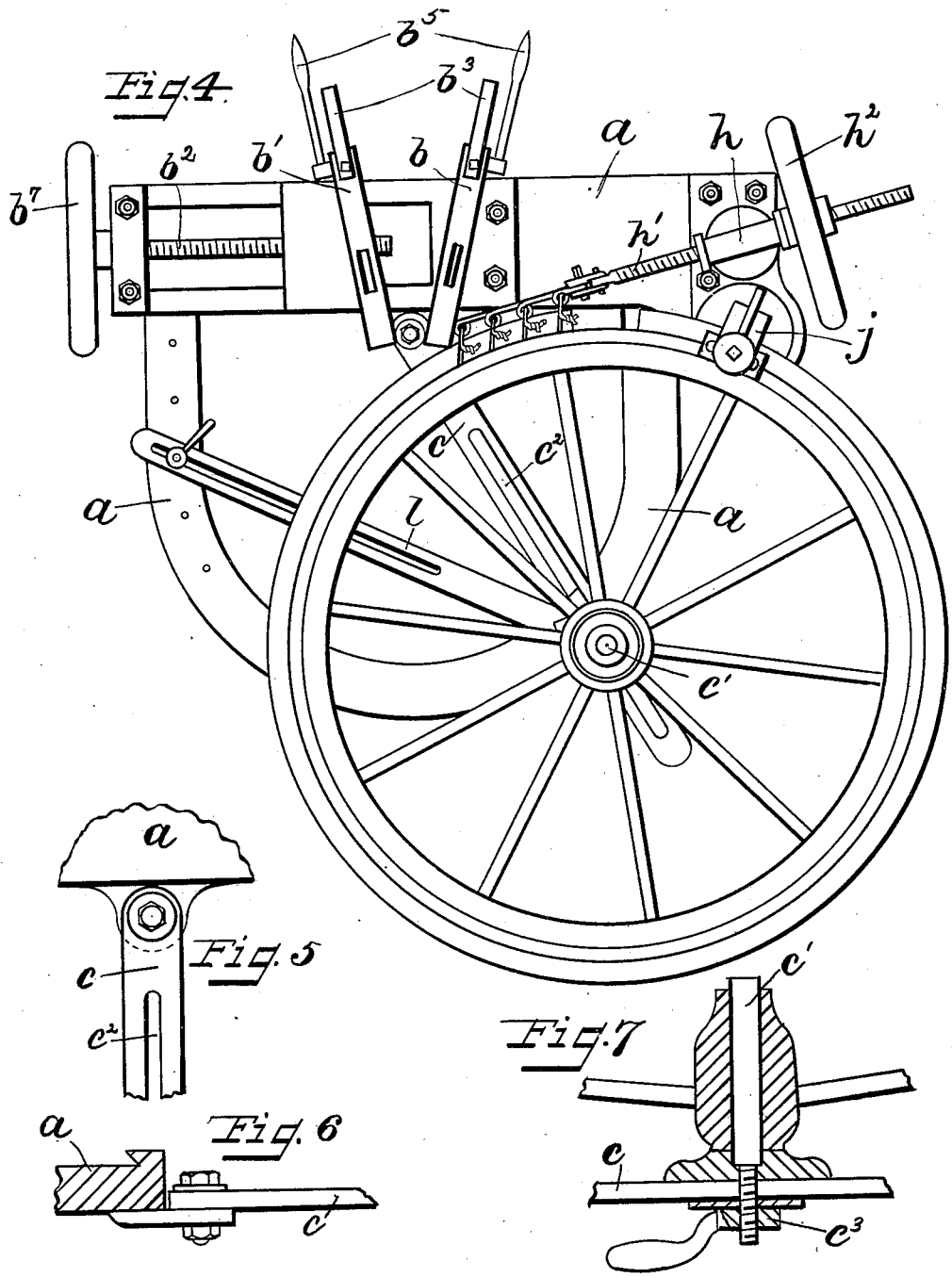

UNITED STATES PATENT OFFICE.

SAMUEL W. COLLINS, OF INDIANAPOLIS, INDIANA, ASSIGNOR, BY MESNE ASSIGNMENTS, TO THE CONSOLIDATED RUBBER TIRE COMPANY, OF JERSEY CITY, NEW JERSEY.

RUBBER-TIRE MACHINE.

SPECIFICATION forming part of Letters Patent No. 676,646, dated June 18, 1901.

Application filed May 26, 1899. Serial No. 718,457. (No model.)

*To all whom it may concern:*

Be it known that I, SAMUEL W. COLLINS, a citizen of the United States, residing at Indianapolis, in the county of Marion and State of Indiana, have invented certain new and useful Improvements in Rubber-Tire Machines, of which the following is a specification.

My invention relates to improvements in rubber-tire machines. It especially relates to machines for securing onto vehicle-wheels rubber tires which are held in place by a retaining band or bands of metal extending through the rubber of the tires.

My invention consists in the constructions and combinations of parts hereinafter described and claimed.

In the accompanying drawings, Figure 1 is a plan view of a machine embodying my invention. Fig. 2 is a partial sectional elevation of the same. Fig. 3 is a detail view of the band-holding devices. Fig. 4 is a plan view showing the parts in different positions of operation. Figs. 5, 6, and 7 are detail views of the wheel-support.

Like parts are represented by similar letters of reference in the several views.

The working parts of the machine are supported on a main frame or table $a$, which may be supported on legs in any suitable manner. On this main frame or table are mounted band-holding clamps or jaws $b$ $b'$, one pair of these jaws, $b$, being preferably secured to the frame or table and the other pair being adapted to slide thereon, suitable ways being provided in the table for this purpose in a well-known manner. Means are provided for adjusting the jaws to different distances apart, this being preferably accomplished by a screw $b^2$, having a hand-wheel $b^7$, with the screw passing through the lower part of the clamping-jaws $b'$, which are screw-threaded for this purpose.

Hinged to the frame or table $a$ is a support $c$, which supports a spindle $c'$, on which the wheel to be equipped with the rubber tire is mounted. This spindle is attached to the support preferably by a sliding block adapted to be adjusted to or from the table in a slotted opening $c^2$ and held in different positions of adjustment by clamping-screws $c^3$.

On one side of the frame is hinged a swiveled box or support $h$, through which extends a screw $h'$, having a hand-wheel $h^2$ thereon, and on the end of this screw is a jaw or clamp adapted to engage a retaining band or bands. On the same side of the frame and preferably adjacent to the screw-threaded bar is a clamp $j$, adapted under certain conditions to clamp the wheel-rim to hold the same. The jaws $b$ and $b'$ are preferably extended, so as to project into the wheel-rim, and each of the stationary set of jaws has an auxiliary opening $b^8$, through which the band or bands are adapted to pass, in the manner hereinafter described, in tightening the tire.

Means are provided for opening and closing the jaws. This may be accomplished by having each of the jaws normally held open by springs $b^3$ and adapted to be closed by cams $b^4$, operated by handles $b^5$. These cams operate against movable plates $b^6$, which are adjusted by set-screws to cause the jaws to close to the required amount to engage different-sized bands.

In the operation of the machine the tire to be placed on the wheel is provided with the necessary band or bands, passing through the same, one end of the band or bands being secured to the stationary jaws $b$. The other end or ends are passed through the movable jaws $b'$ and through the auxiliary openings $b^2$ and engaged by the clamp on the end of the tension-screw. The tire is now slipped into the channel and the tension device operated until the bands have tightened the rubber in the channel, the wheel being drawn up so that the jaws project into the channel and retain the wires therein. The wires or retaining-bands are then clamped in the jaws and cut off to the proper length and joined together in any well-known manner, preferably by brazing, soldering, electric welding, or otherwise, the necessary adjustment for securing the bands being accomplished by moving the adjustable pair of jaws back or forth to the proper position for bringing the ends of the bands together while being united. After the bands are united the jaws are released and the wheel is moved to a suitable position on the support, when the support is swung on its pivotal center until the wheel-felly is engaged by the clamp *j*. A pivoted brace *l* is placed against the spindle or wheel-hub, the opposite end being connected to the frame in such a manner as to firmly brace the same while the space in the rubber is being closed.

It should have been stated that before the tire is fastened down I place under the rubber and between the rubber and the channel flexible wires or connections at stated intervals apart and bind the rubber tire to the wheel at this point, so that the last compression or a sufficient amount of compression to compensate for the drawing up of the rubber comes within this portion of the tire. When the tire is properly on the wheel and swung over to the position before described, the flexible connections are joined together by any suitable means and connected to the tension-screw *h'*, as shown in Fig. 4, and by turning the tension device the rubber is drawn along in the channel, so as to close the space in the rubber over the joints in the retaining-bands.

Having thus described my invention, I claim—

1. In a rubber-tire machine, the combination with a set of stretching and holding clamps to tighten and hold the tire-retaining devices while their ends are being united, another set of clamps to bring the ends of the rubber tire together, of a pivoted wheel-support adapted to be moved to different positions so as to bring the wheel thereon successively to the proper position to be operated on by the different series of clamps, substantially as specified.

2. In a rubber-tire machine, a main frame, a pivoted wheel-support, band-holding clamps adjacent to said wheel-support, stretching and tightening devices adjacent to said band-holding clamps, tire-engaging devices to engage the tire when the wheel-support is moved to a different position, and means for holding said wheel-support in different positions to be operated on successively by the band-holding clamps and the tire-engaging devices, substantially as specified.

In testimony whereof I have hereunto set my hand this 6th day of May, A. D. 1899.

SAMUEL W. COLLINS.

Witnesses:
JOHN W. PARKHURST,
CHAS. I. WELCH.